3,480,389
PREPARATION OF ACTIVE ALUMINA AGGLOMERATES OF HIGH MECHANICAL STRENGTH
Maxime Graulier, Paris, France, assignor to Produits Chimiques Pechiney-Saint-Gobain, Neuilly-sur-Seine, France
No Drawing. Filed July 1, 1966, Ser. No. 562,076
Claims priority, application France, July 9, 1965, 24,121
Int. Cl. C01f 7/02, 7/36
U.S. Cl. 23—143                              6 Claims

ABSTRACT OF THE DISCLOSURE

The preparation of active alumina agglomerates of high mechanical strength and low active surface consisting of treating pellets of alumina in an autoclave in an acidic medium at a temperature above 100° to 250° C. for a time within the range of 1–20 hours, followed by drying the treated pellets and calcining the dried pellets at elevated temperature.

---

This invention relates to agglomerates of active alumina characterized by high mechanical strength and relatively small active surface and it relates more particularly to agglomerates of the type described which find use as catalyst carriers and to the method for the preparation of same.

It is known that heterogeneous catalysis necessitates the use of catalyst carriers having different specific surfaces, depending somewhat upon the reactions to be carried out. The agglomerates of active alumina, which are often used as catalyst carriers, can be obtained in various forms such as granules, extruded products, chiefly from alumina trihydrate of the hydrargillite variety, partially and rapidly dehydrated and which can thereafter be set in the presence of water or a moist atmosphere. The regulation of the active surface of such agglomerates is obtained by varying the calcination temperature following agglomeration in which calcination is employed to reactivate the agglomerates. For obtaining large active surfaces, the reactivation temperature is lower than 1000° C. and agglomerates are secured under such conditions having good mechanical strength. However, in other cases, where the agglomerates must have a smaller surface area, this is obtained by calcination for reactivation at temperatures which are somewhat inversely proportional to the active surface.

It is noted that the mechanical strength of the agglomerates depends greatly on the reactivation temperature. Mechanical strength or solidity is good for calcination carried out at relatively high temperatures such as 1400° or 1600° C., in which the resulting active surface is very small, such as of the order of one m.$^2$/g., while the solidity of the agglomerates calcined at temperatures in the order of 1000° C. is less satisfactory. The specific surface of the latter is larger, such as about 10 m.$^2$/g., and it is suitable for different reactions.

In order to overcome this loss in mechanical strength, it has been proposed to make use of different solutions. In the French Patent No. 1,386,364, filed on Dec. 2, 1963, description is made of the preparation of activated alumina by treatment of the alumina in an autoclave in the presence of water and the reactivation thereof by calcination at various temperatures. According to this method, reactivated agglomerates having improved mechanical strength are obtained at temperatures ranging from 800° C./1000° C. to 1400° C./1600° C., the mechanical strength being evaluated by reference to the crushing strength. It is believed that this increase in mechanical strength for surfaces of 10 m.$^2$/g. is due to a difference in the way of the evolution of the crystalline structure as a function of reactivation temperature.

Though the solidity of the products thus obtained is satisfactory and permits use in industrial practice, applicant has found a process for the preparation of agglomerates of alumina, the active surface of which is capable of being regulated within large limits and which enjoys high mechanical strength, even greater than the strengths produced in accordance with the process of the aforementioned French patent. This new process consists in treating active alumina agglomerates in an acidified aqueous medium in an autoclave at a temperature greater than 100° C. and preferably at a temperature within the range of 150° to 250° C. for a period of time ranging from 1 to 20 hours. The treated agglomerates are dried and calcined at temperatures depending upon the desired specific surface and it is an object of this invention to produce and to provide a method for producing high strength activated alumina agglomerates of the type described having different specific surfaces including low surface areas.

Treatment of the alumina agglomerates in an autoclave, under acidic conditions, is believed to bring about the transformation of the alumina to boehmite, as shown by x-ray diffraction. However, the reason for the large increase in mechanical strength of the agglomerates is not well known. It may be that the texture of the boehmite crystals obtained is different and provides a beter cohesion between dehydrated and reactivated crystals.

In accordance with the practice of this invention, it is possible to treat different alumina agglomerates in the autoclave to embody different ways of achieving the acid influence. For example, prior to their treatment in the autoclave, the agglomerates can be impregnated with the acid either in vapor phase or in liquid phase. It is also possible to treat the agglomerates without previous impregnation with the acid. In such event, the acidity is provided by an aqueous liquid in the autoclave. As the acid, use can be made of any acid, their effects being sensibly the same. However, it is preferred to make use of certain acids depending upon their volatility.

The following examples, which are given by way of illustration, but not by way of limitation, concern the vapor phase treatment in an autoclave of pellets of active alumina in which the pellets have previously been impregnated either with acetic acid or nitric acid. The values given in the table relate to the total porous volume, the percent loss by attrition with microcrushers under conditions which can be compared, and the average crushing strength of the pellets for different temperatures of thermal treatment. For comparison, the results are given of the values secured with pellets which have not been treated in an autoclave but have otherwise been calcined at elevated temperature, and with pellets which have been treated in an autoclave but in the presence of water and calcined.

EXAMPLE 1

Pellets from 2 to 5 mm. in diameter are prepared by agglomeration of alumina having a large active surface and which have been moistened with water. These pellets, after drying, are impregnated with 2% by weight acetic acid based upon an alumina content calculated as $Al_2O_3$. The impregnated pellets are treated in an autoclave filled with steam at a temperature of 215° C. for 15 hours. After drying at 110° C., separate batches were calcined at temperatures of 1000°, 1100° and 1200° C.

EXAMPLE 2

Pellets prepared in accordance with the preceding Example 1 are impregnated with 5% acetic acid based upon the weight of the alumina and treated in the autoclave, dried and reactivated under the same conditions as in Example 1.

EXAMPLE 3

Under the same general conditions as those of the preceding Examples 1 and 2, pellets of alumina are impregnated with 15% by weight acetic acid based upon the alumina. The calcination, after drying, is carried out out at 500°, 900°, 1100° and 1200° C.

EXAMPLE 4

Under the same general conditions as those of the preceding examples, the same type of pellets are impregnated with 15% nitric acid based upon the alumina. After drying, the treated pellets are calcined at temperatures of 500°, 1100° and 1200° C.

|  | Drying or calcination temperature, ° C. | Surface, m.²/g. | Total porous volume, cm.³/g. | Loss by attrition, percent | Average crushing, kg. |
|---|---|---|---|---|---|
| Example 1 | 110 | 34 |  | 22 | 2 |
|  | 1,000 | 35 |  | 14.5 | 4.7 |
|  | 1,100 | 17 |  | 5.2 | 9.4 |
|  | 1,200 | 10 | 0.54 | 5.4 | 12.2 |
| Example 2 | 110 | 47 |  | 16.5 | 4 |
|  | 1,000 | 55 | 0.65 | 3.1 | 7.1 |
|  | 1,100 | 42 |  | 3.0 | 9.3 |
|  | 1,200 | 12 | 0.59 | 5.5 | 12.2 |
| Example 3 | 110 | 45 | 0.54 | 18 | 3 |
|  | 500 | 130 |  | 5.7 | 6.2 |
|  | 900 | 65 |  | 4.5 | 7.5 |
|  | 1,100 | 49 | 0.66 | 6.5 | 9.3 |
|  | 1,200 | 11 | 0.53 | 6.8 | 10 |
| Example 4 | 110 | 74 |  | 18 |  |
|  | 500 | 154 |  | 10.5 |  |
|  | 1,100 | 45 |  | 8 |  |
|  | 1,200 | 11 |  | 17 |  |
| Pellets not treated in autoclave. | 500 | 350 | 0.63 | 3 | 10 |
|  | 1,100 | 97 | 0.63 | 18 |  |
|  | 1,200 | 14 |  | 30 | 2 |
| Pellets treated in autoclave | 110 | 25 |  | 50 | 1.5 |
|  | 600 | 57 | 0.63 | 24 |  |
|  | 1,000 | 30 |  | 20 | 3.7 |
|  | 1,100 | 20 |  | 12 | 6.0 |
|  | 1,200 | 9 | 0.55 | 8 | 8.2 |

From the foregoing data it will be seen that pellets which have not been treated in an autoclave and which are reactivated at a temperature of 500° C. give large surface areas (350) and high solidity (3%) by comparison with the same pellets reactivated at higher temperature in which the surface area is 97 (at 1100° C.) and 14 (at 1200° C.) and in which the loss by attrition is 18% (at 1100° C.) and 30% (at 1200° C.). On the other hand, when the pellets are treated in an autoclave in the presence of an acid, in accordance with the practice of this invention, these same pellets have a desirable small surface area at the same temperature of reactivation and with increased mechanical strength as evidenced by the reduction in loss by attrition. Pellets treated in an autoclave in an aqueous medium and in the absence of acid gave intermediate results but, any event, poorer than those obtained by acid treatment in an autoclave in accordance with the practice of this invention.

It will be understood that various changes may be made in the process without departing from the spirit of the invention. For instance, it is often times advantageous to calcine the agglomerates at temperatures below 1000° C. and particularly in the order of 500° C. prior to treatment by the acid and to their treatment in the autoclave.

I claim:

1. A process for the preparation of active alumina agglomerates of high mechanical strength and predetermined active surface consisting of the steps of treating pellets of alumina in an autoclave in the presence of steam in an acidic medium selected from the group consisting of acetic acid and nitric acid at a temperature above 100° C. for a time within the range of 1 to 20 hours, drying the treated pellets, and calcining the dried pellets at an elevated temperature.

2. A process as claimed in claim 1 in which the pellets are heated in the autoclave to a temperature within the range of 150° to 250° C.

3. The process as claimed in claim 1 in which the pellets are acidified by impregnating the pellets with the acid before treatment in the autoclave.

4. The process as claimed in claim 1 in which the pellets are acidified by treatment with an acid while in the autoclave.

5. The process as claimed in claim 1 in which the pellets are treated in the autoclave in the presence of acid in an aqueous liquid phase.

6. The process as claimed in claim 1 in which the pellets are heated to a temperature below 1000° C. but above 500° C. before treatment in the autoclave.

References Cited

UNITED STATES PATENTS 2,774,744  12/1956  Barrett et al. _____ 23—143 X
3,310,366  3/1967  Koepernik _____ 23—143 X OSCAR R. VERTIZ, Primary Examiner G. T. OZAKI, Assistant Examiner U.S. Cl. X.R.

23—141; 252—463